C. W. & E. A. JONES.
FRUIT-DRIER.
No. 192,513. Patented June 26, 1877.
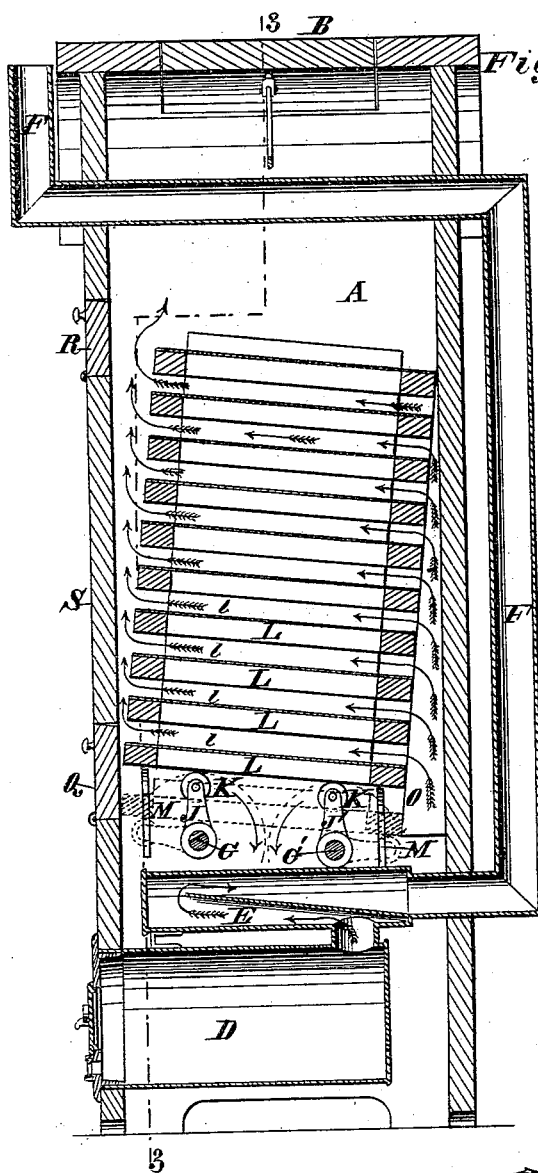
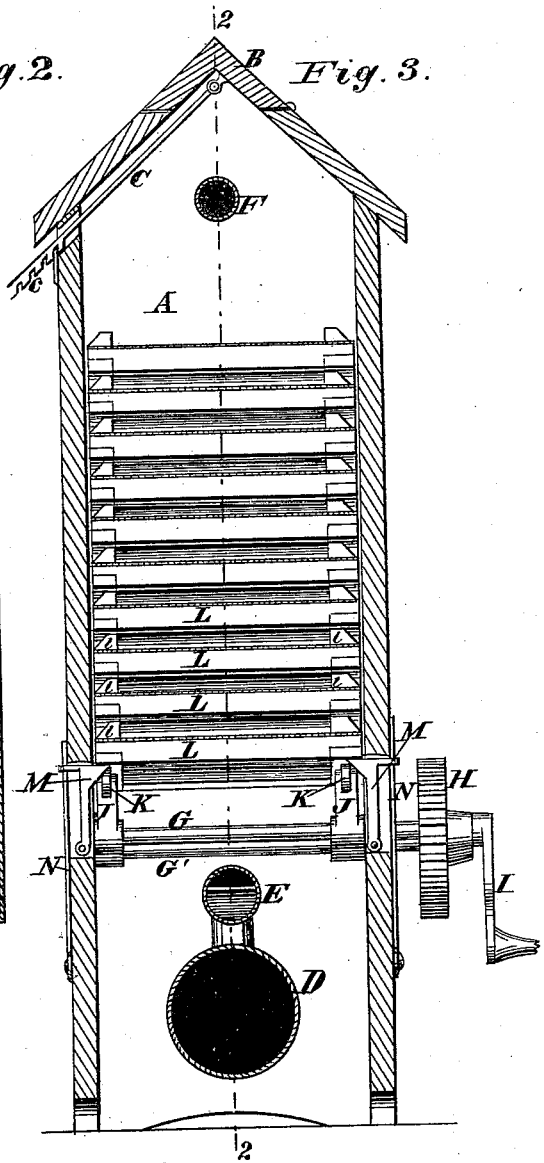
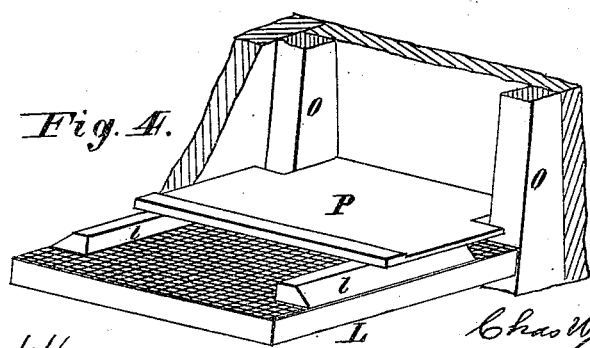
WITNESSES
INVENTOR
Chas W. Jones
Edgar A. Jones
By _____ Attorneys

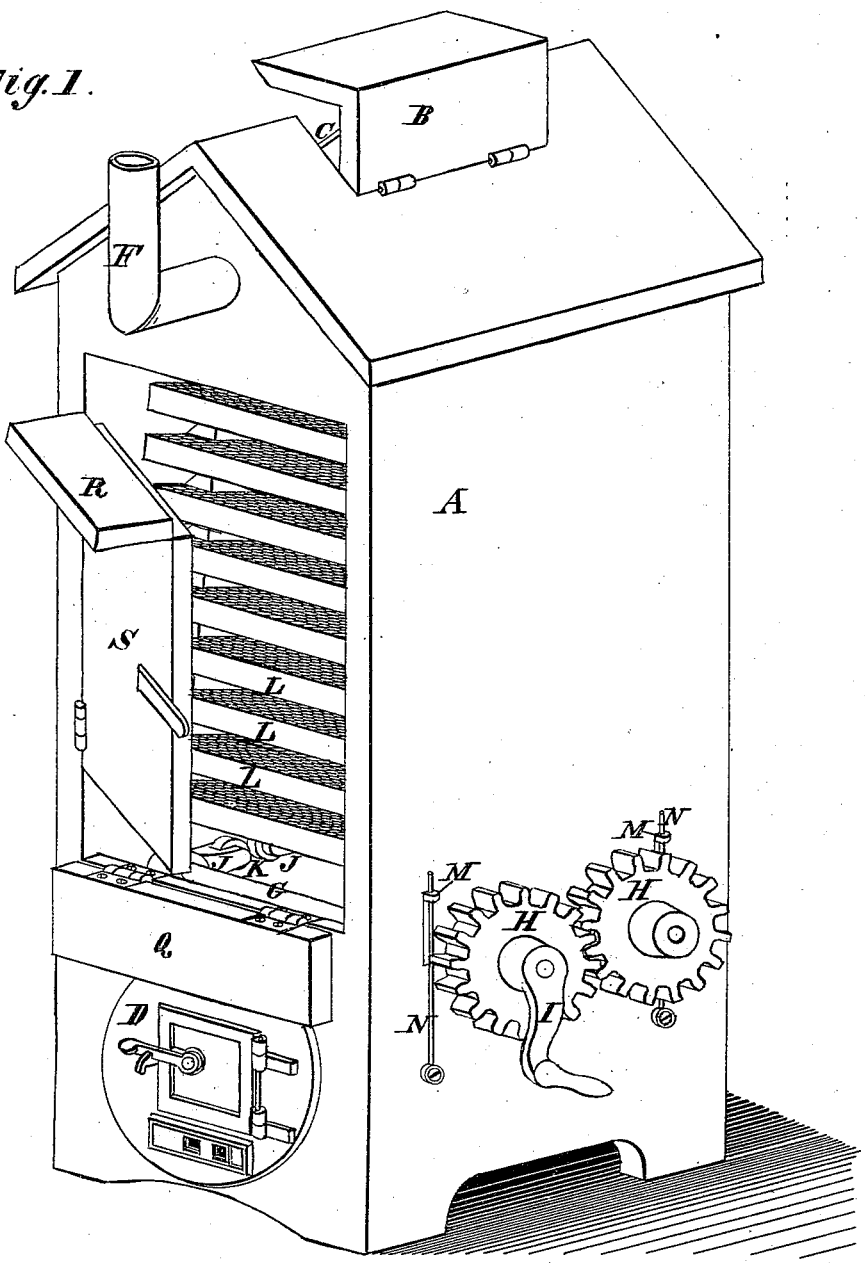

UNITED STATES PATENT OFFICE.

CHARLES W. JONES, OF CENTREVILLE, AND EDGAR A. JONES, OF STURGIS, MICHIGAN.

IMPROVEMENT IN FRUIT-DRIERS.

Specification forming part of Letters Patent No. 192,513, dated June 26, 1877; application filed December 1, 1876.

*To all whom it may concern:*

Be it known that we, CHARLES W. JONES, of Centreville, and EDGAR A. JONES, of Sturgis, both in the county of St. Joseph and State of Michigan, have invented a certain new and Improved Fruit-Drier, of which the following is a specification:

Our invention relates to that class of driers wherein the heated air-currents from a furnace or heater rise by their rarefaction and carry off the moisture from the fruit placed above the heater.

The object of our invention is to combine the most approved principles in drying fruit, vegetables, &c., in a drier that is compact in form and within the reach of farmers and fruit growers, thus enabling them to dry their surplus fruit equally as well as is done on a larger scale by the factory-driers. For this purpose we make an upright drying-chamber, of suitable size and height to give the desired capacity, near the bottom of which is a stove or heater, with a sheet-iron drum on top, the smoke-pipe from which is carried out through the back side of the drier, and when near the top is again brought entirely through, and then turned upward so as to keep all the heat possible in the drier. A short distance above the top of the drum spoken of is the mechanism for raising the trays of fruit, together with spring-catches for holding them up as fast as they are elevated. This mechanism consists of two shafts running entirely through the drier, and far enough apart to admit of suitable cog-wheels on the outside, which mesh together and cause both shafts to rotate simultaneously when one of them is turned by a hand-crank attached for that purpose. Near each end of these shafts, and on the inside of the drier, are firmly fastened short cranks carrying rollers in their ends that operate directly on the under side of the fruit-trays, and lift on them in four places at once, to carry them up true and at right angles with the plane of the shafts. In or near each corner of the drier are spring-catches that are hinged in the wood below, and project at the top about three-fourths of an inch inside the surface of the chamber, the top bar being extended outside the drier, and held in place by springs, which allow the catches to be pressed outward by each tray as it rises, and then force them inward under the tray to retain it when the cranks recede.

From side to side or lengthwise of the shafts the drying-chamber is of proper size to have the fruit-trays fill it as nearly as they can, and slide easily. The other way, or from front to rear, it is several inches larger than the trays. The plane of the shafts, and also of the spring-catches, is not at right angles with the perpendicular walls, but inclines rearward in such a manner that the edges of the trays will be several inches lower at the back than at the front, and the trays are prevented from sliding back too far by beveled guides placed in the back corners of the dryer for that purpose. The object of this arrangement is to cause the bottom trays to fill the drier at the front side, and the top trays to fill it at the back side. The side bars of the tray-frames are deep enough to keep them the proper distance apart when resting one upon another, but the front and rear bars are only about one-half as deep, thus leaving spaces for the air-current to pass from the rear to the front of the drier.

The fruit-trays consist of the usual wooden frames, covered with netting or other suitable material, and when loaded with the prepared fruit are introduced through a small door in the front of the drier, and rest on the shafts or hubs of the elevating-arms in such a manner that the back side of the tray is several inches from the inner surface of the drying-chamber, leaving at back a vertical flue, which, when the drier is full, is contracted upward by the approach of the successive trays to the rear wall as they ascend.

In first introducing trays to the drier this rear flue for the heated air is closed by a self-adjusting slide, placed on top of the first-inserted tray. The fruit is subjected for a few moments to the strong heat directly from the furnace, which at once arrests fermentation, and sets or fixes the natural color and flavor of the fruit. When ready to introduce another tray the crank on the outside is turned, which causes the short arms inside to raise the tray above the spring-catches, where it is retained, while the short cranks descend to be in position for the next tray, which is introduced in the same manner as the first. When the third one is ready the second one is raised, and carries up the one above it. This operation is repeated, and as the top tray rises it works against the beveled cleats toward the back side of the drier, narrowing the air-flue at the back and opening one in front for the escape of the air that has become cooled and surcharged with moisture from contact with the damp fruit. When the first tray arrives at or near the top it touches the back side of the drier, and the self-adjusting slide can be removed. The operation is now continuous, the dried product being removed from the top as fast as the fresh fruit is introduced at the bottom. By this very desirable arrangement the heated air-currents are not only allowed to rise through the trays, but they also pass edgewise and conduct off the moisture without being obliged to carry it through the trays above, and the worst fault of hitherto-constructed portable driers has been surmounted in this very simple and practical manner.

In the roof of the drier a trap-door is hinged that can be raised sufficiently by a connecting-rod for that purpose to allow the escape of the damp air, fresh air being supplied through the apertures below the heater.

The front of the drier has small doors at the proper places, to introduce and withdraw the fruit-trays, the remaining part between the two small doors being also hinged, to allow of its being opened when desired.

In the accompanying drawing, Figure 1 is a perspective view of our improved fruit-drier with the doors open. Fig. 2 is a vertical section of the same in a plane extending from front to back on the line 2 2 in Fig. 3. Fig. 3 is a vertical section in the planes indicated by lines 3 3, Fig. 2. Fig. 4 is a perspective view of a portion of the back of the drier, showing the oblique cleats or guides and the self-adjusting slide resting on the uppermost tray.

A represents a vertical trunk or casing open at bottom, and closed at top by a trap-door or damper, B, which may be operated by a sliding-rod, C, notched, as shown at c, to engage over a suitable catch so as to support the damper at any height to regulate the discharge-aperture. D is a furnace, arranged in the lower part of the casing A, and communicating with a drum, E, to increase its heating effect. F is the discharge-flue for smoke, which extends upward, as shown, and is brought forward through the upper part of the casing so as to utilize the heat. G G' are a pair of shafts connected by pinions H, so as to cause them to rotate in unison in opposite directions. I is the operating crank or handle. J J' are crank-arms keyed on the shafts G G', and carrying at their extremities rollers K.

L L L are trays for containing the fruit or other material to be dried. The said trays are provided on two sides with cleats l, extending the vertical thickness of their frames at these sides, and leaving a space for a free passage of air from front to back between the trays. The cranks J J' are so located on the shafts G G' as to cause the rollers to engage under the side frames of the trays as the cranks are rotated, thus lifting the trays in four places simultaneously, as before explained. M M are beveled catches set in suitable mortises in the sides of the casing, and pressed inwardly by springs N so as to engage beneath each tray as it is raised by the action of the cranks J J'. O O represent beveled cleats applied within the rear corners of the casing A, so as to form guides for the trays in their upward movement, the diverse heights of the shafts G G' causing the trays to slant backward, for which purpose the front shaft, G, is set somewhat higher than the rear shaft, G'. P represents a plate formed at back to fit between the guides O O, resting on the cleats l of the tray, which is first inserted so as to prevent the passage of air directly upward above the said tray and cause it to pass upward over the top thereof. The plate P, resting loosely on the cleats l l, constitutes a self-adjusting slide, being gradually pressed forward as the tray on which it rests ascends and approaches the back of the casing.

Q represents a small door for inserting the trays in succession above the shafts G, and R a similar door through which they are withdrawn in succession from the top of the series. S is the main door, which may be opened when required to expose the whole interior of the casing, but does not have to be open during the regular operation of the apparatus.

It will be observed that by the oblique shape of the guiding-cleats O O, and the oblique position of the stack of trays, a hot-air flue is formed at the back of the apparatus, diminishing in capacity upward, and a discharge-flue is formed in front, increasing in capacity upward. The arrows indicate the course of the hot air upward behind, forward between, and again upward in front of the trays. The upwardly-tapering back flue, the upwardly-flaring front flue, and the spaces between the trays will be seen to co-act with excellent effect to cause the vapors to be carried from the drying material, as fast as they are formed, without contact with the material above.

Having thus described our invention, the following is what we claim as new and desire to secure by Letters Patent:

1. The combination of an upright drying-chamber, A, a series of interchangeable trays, L, provided with side cleats l, for forming horizontal passages between them, and suitable supports J J', of unequal height, for sustaining the stack of trays in an inclined position, substantially as and for the purposes set forth.

2. The combination, in a drying-apparatus, of a pair of shafts, G G', each furnished with lifting-arms having rollers which bear directly on the tray-frames, in the manner and for the purposes set forth.

3. The self-adjusting slide P, applied on top of the trays to close the air-space at their edge and direct the air-currents through or between them, as explained.

In testimony of which invention we hereunto set our hands this 16th day of November, A. D. 1876.

CHARLES W. JONES.
EDGAR A. JONES.

Witnesses:
G. D. BOUTON,
WM. W. LEDYARD.